United States Patent [19]

Anderson et al.

[11] 4,254,701
[45] Mar. 10, 1981

[54] BLADE ARRANGEMENT IN A PEACH PITTER

[75] Inventors: David M. Anderson, Lafayette, Calif.; John C. Erb, Carson City, Nev.

[73] Assignee: Filper Corporation, Reno, Nev.

[21] Appl. No.: 940,917

[22] Filed: Sep. 11, 1978

[51] Int. Cl.³ .................... A23N 4/04; A23N 4/22
[52] U.S. Cl. ................................ 99/554; 99/551; 99/552
[58] Field of Search .......... 99/547, 549, 550, 551-555, 99/564, 562, 563

[56] References Cited

U.S. PATENT DOCUMENTS

| 1,524,886 | 2/1925 | Roberts | 99/552 |
|---|---|---|---|
| 1,754,636 | 4/1930 | McCollam | 99/552 |
| 2,664,127 | 12/1953 | Perrelli . | |
| 2,786,562 | 3/1957 | McClelland . | |
| 2,788,818 | 4/1957 | Skog . | |
| 2,826,227 | 3/1958 | Perrelli et al. | 99/551 |
| 2,906,307 | 9/1959 | Ciraolo | 99/552 |
| 2,933,174 | 4/1960 | Hait et al. . | |
| 2,969,867 | 1/1961 | McClelland . | |
| 2,984,273 | 5/1961 | Erickson | 99/551 |
| 3,045,732 | 7/1962 | Vadas | 99/551 |
| 3,064,794 | 11/1962 | Anderson . | |
| 3,179,137 | 4/1965 | Kilner . | |
| 3,199,652 | 8/1965 | Kilner et al. . | |
| 3,244,268 | 4/1966 | McGihon . | |
| 3,353,860 | 11/1967 | Meissner . | |
| 3,688,826 | 9/1972 | Amori | 99/563 |
| 3,829,591 | 8/1974 | Browne | 99/553 |
| 4,122,765 | 10/1978 | Silvestrini | 99/551 |

Primary Examiner—Philip R. Coe
Assistant Examiner—Timothy F. Simone

[57] ABSTRACT

A peach pitter of the torque type in which the space between the pit gripping teeth on the peach bisecting blades at the pitting station is open at both ends and each successive peach is fed into said space through one open end and the preceeding pitted peach and separated pit are discharged out of the other open end of said space.

4 Claims, 10 Drawing Figures

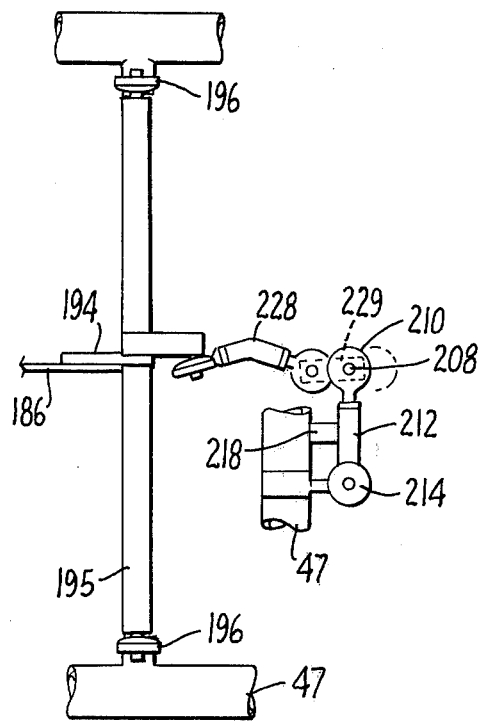
FIG. 9.
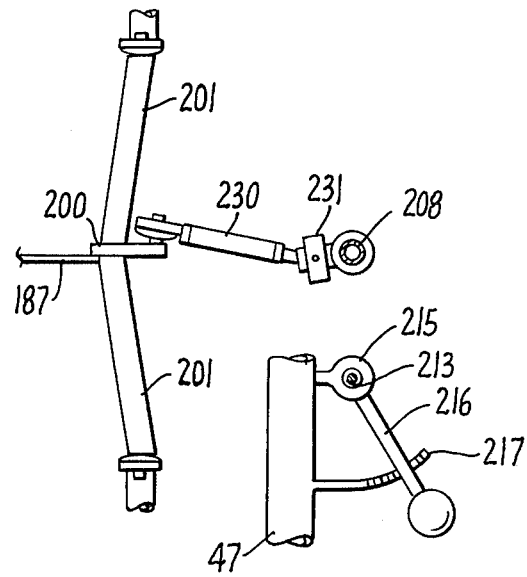
FIG. 10.
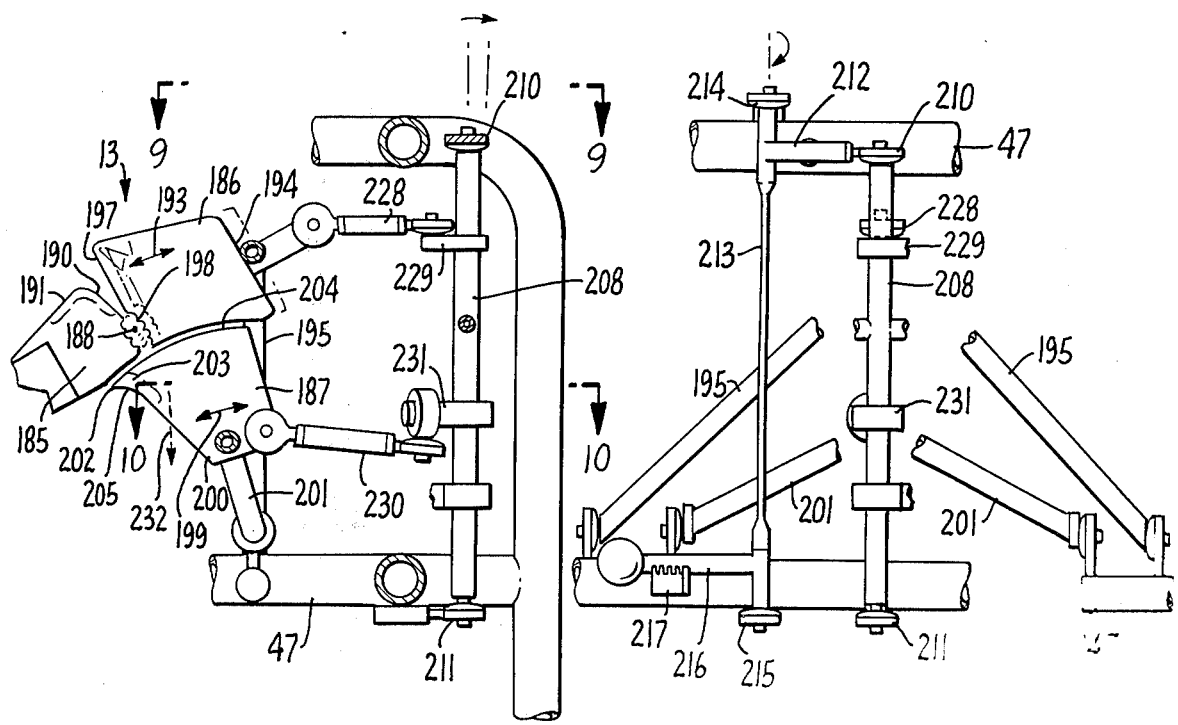
FIG. 7.
FIG. 8.

4,254,701

BLADE ARRANGEMENT IN A PEACH PITTER

SUMMARY OF THE INVENTION

This invention relates to a single, unitary machine composed of an assembly of components for receiving clingstone peaches from a travelling belt and discharging peach halves and pits into a flume or belt below the other end of the machine. The peach pitter of this invention is of the type commonly known as a "torque" pitter in which the peach flesh is bisected by a pair of blades up to the pit, the pit is gripped at its opposite edges and the peach halves are twisted or "torqued" in opposite directions about an axis through the held pit.

In order for a clingstone peach to be properly pitted by the torque method, it is necessary that it be positioned with its suture plane in the plane of the peach bisecting blades. The machine of this invention therefore, includes a peach orienting assembly which accepts peaches one by one and aligns or orients the same with their sutures in a single plane for transfer to the peach bisecting blades. Peaches are fed one by one to the orienting assembly by a feeder which receives the same from a horizontal travelling belt or "merry-go-round" commonly found in a peach cannery.

Specifically, this invention relates to an improvement in the structure, arrangement, and operation of the peach bisecting blades relative to the path of travel of unpitted peaches to the pitting station between the blades and discharge of the pitted peach halves and pit therefrom. The elongated space between the pit gripping teeth on the pair of peach bisecting blades extends in continuation of such path and is open at both ends so that each succeeding peach may be fed into one end of the space in one direction and discharged out of the other end of the space in the same direction.

It is therefore an object of this invention to provide improved means and method for transferring the peaches to and from a pitting station in a rapid and efficient manner.

Another object of this invention is the provision of an arrangement of peach bisecting blades with pit-gripping means in a torque peach pitter such that each successive peach is fed into one end of the space between such pit gripping means in the same direction as each preceeding pitted peach and its pit are discharged from the other end.

Other objects and advantages will become apparent from the following description taken in conjunction with the accompanying drawings.

BRIEF DESCRIPTION OF THE DRAWINGS

FIG. 7 is a partial side elevational view of the peach bisecting blades portion and associated driving means of the peach pitter of FIGS. 1 and 2 with portions removed for clarity;

FIG. 8 is an end elevational view of the portion of the peach pitter shown in FIG. 7;

FIG. 9 is a partial top plan view as seen from line 21—21 of FIG. 19;

FIG. 10 is a partial sectional view as seen from line 10—10 of FIG. 7.

DETAILED DESCRIPTION

Figure 1:
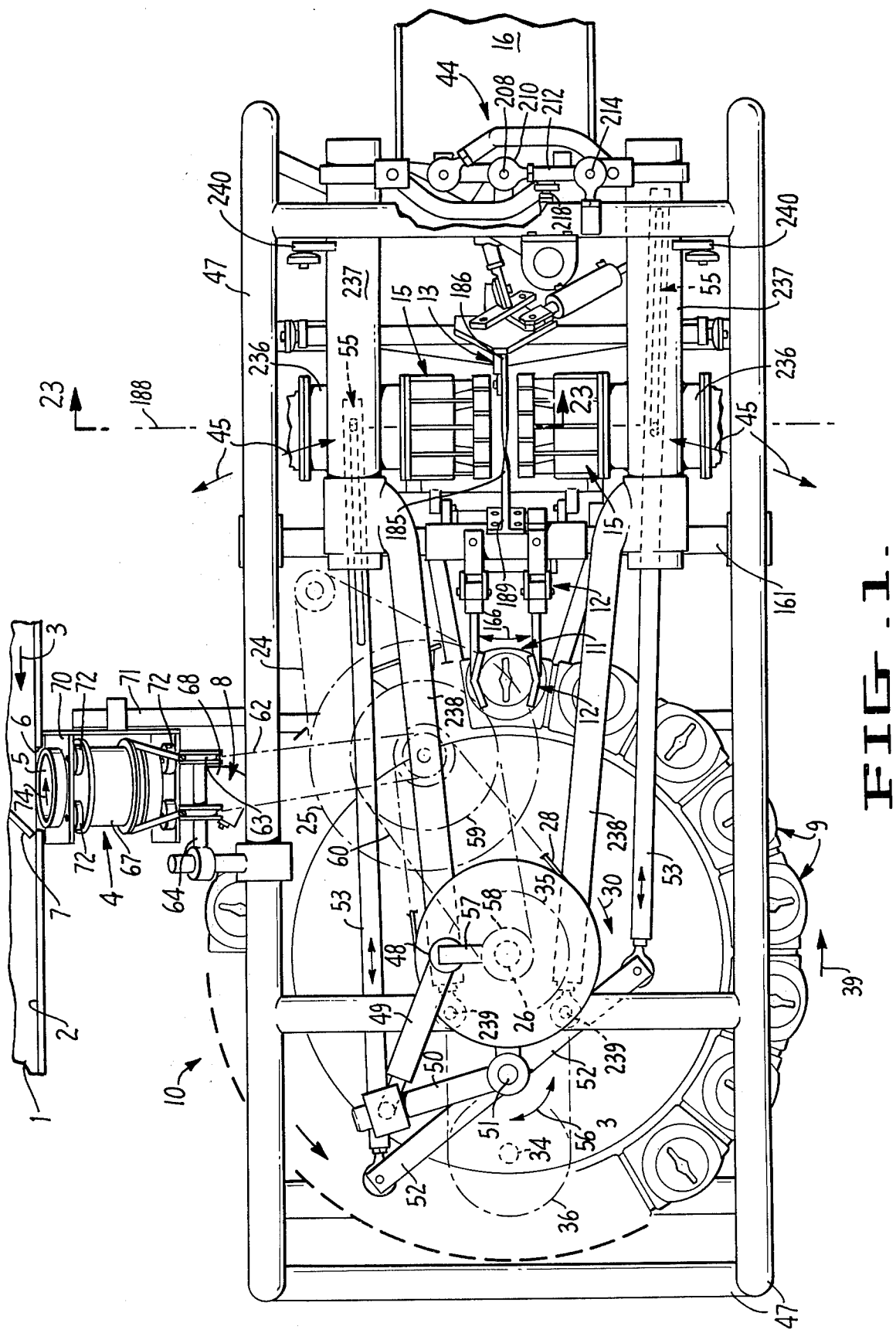
FIG. 1 is a top plan view of the preferred embodiment of the peach pitter of this invention.

Referring to FIG. 1 the travelling belt or merry-go-round 1 has side walls 2 for supporting a single layer of cling peaches travelling in the direction shown by arrow 3.

The downwardly inclined feeder, generally designated 4, of this invention is supported with its upper, elongated inlet end 5 adjacent an opening 6 in side wall 2. A diverter rod 7 lying adjacent the surface of belt 1 serves to urge peaches on the belt toward inlet opening 5.

From the lower discharge end 8 of feeder 4 the peaches are fed one by one into the aligner cups 9 arranged around the circumference of the horizontally disposed, circular aligner 10 as each passes discharge end 8 (also referred to as the "fill" station of aligner 10).

During the process of orienting the peaches, aligner cups 9 travel around the circular path of the circumference of aligner 10 to a transfer station 11, approximately 300 degrees from the discharge end 8 of feeder 4 in the embodiment shown in FIG. 1.

At transfer station 11 each peach in turn, oriented with its suture plane in the vertical central plane of the machine, is transferred by transfer mechanism, generally designated 12, to the peach bisecting blades, generally designated 13, supported in the same plane. These blades have pit gripping teeth 14 (FIG. 2) projecting from their opposed edges which grip the edges of the peach pit as the blades 13 move toward each other and slice through the peach flesh on opposite sides of the pit.

The peach gripping jaws, generally designated 15, are supported on opposite sides of blades 13. Such jaws are spaced from blades 13 as the peaches are transferred thereto and thereafter move toward each other to grip the halves of the peach on opposite sides of blades 13. Jaws 15 (FIG. 1) rotate in opposite directions about an axis extending through the pit which is held by teeth 14 on blades 13 to twist the peach halves loose from the pit.

Thereafter, jaws 15 separate, blades 13 move apart and the peach halves and pit fall by gravity and by the force imparted by the next incoming peach into a belt or flume 16 therebelow.

DRIVE

The entire apparatus is driven by a motor 21 (FIGS. 2, 3) whose shaft pulley 22 continuously drives intermediate shaft 23 through timing belt 24 and pulley 25. Shaft 23 is connected to main shaft 26 for continuously driving the same by pulley 27, timing belt 28, and pulley 29 in the direction of arrow 30 (FIG. 1).

Near its lower end shaft 26 is connected to auxiliary shaft 34 by pulleys 35, 36 on the respective shafts connected by belt 37 for continuously driving shaft 34 in the same direction and at the same speed as shaft 26.

The cyclic drive assembly 38 (FIGS. 2, 3) is supported on shaft 34 intermediate its ends and functions to drive aligner 10 intermittently in the direction of arrow 39 (FIG. 1). Crank arms 40, 41 (FIG. 2) are respectively secured to the lower ends of shafts 26, 34 for continuous rotation therewith. The other end of crank arm 40 is pivotally connected to one end of a link 42 for actuating transfer mechanism 12.

The other end of crank arm 41 is pivotally connected to one end of a link 43 which drives the linkage assembly 44 at the other end of the pitting machine. Linkage assembly 44 operates the closing of blades 13 through the peach and into gripping relation with the pit, the moving of peach gripping jaws 15 into gripping relation with the exposed opposite halves of the peach, and the retraction thereof in the directions of arrows 45 (FIG. 1).

All shafts are suitably journaled for rotation in bearings supported on a main frame 47.

Figure 2:
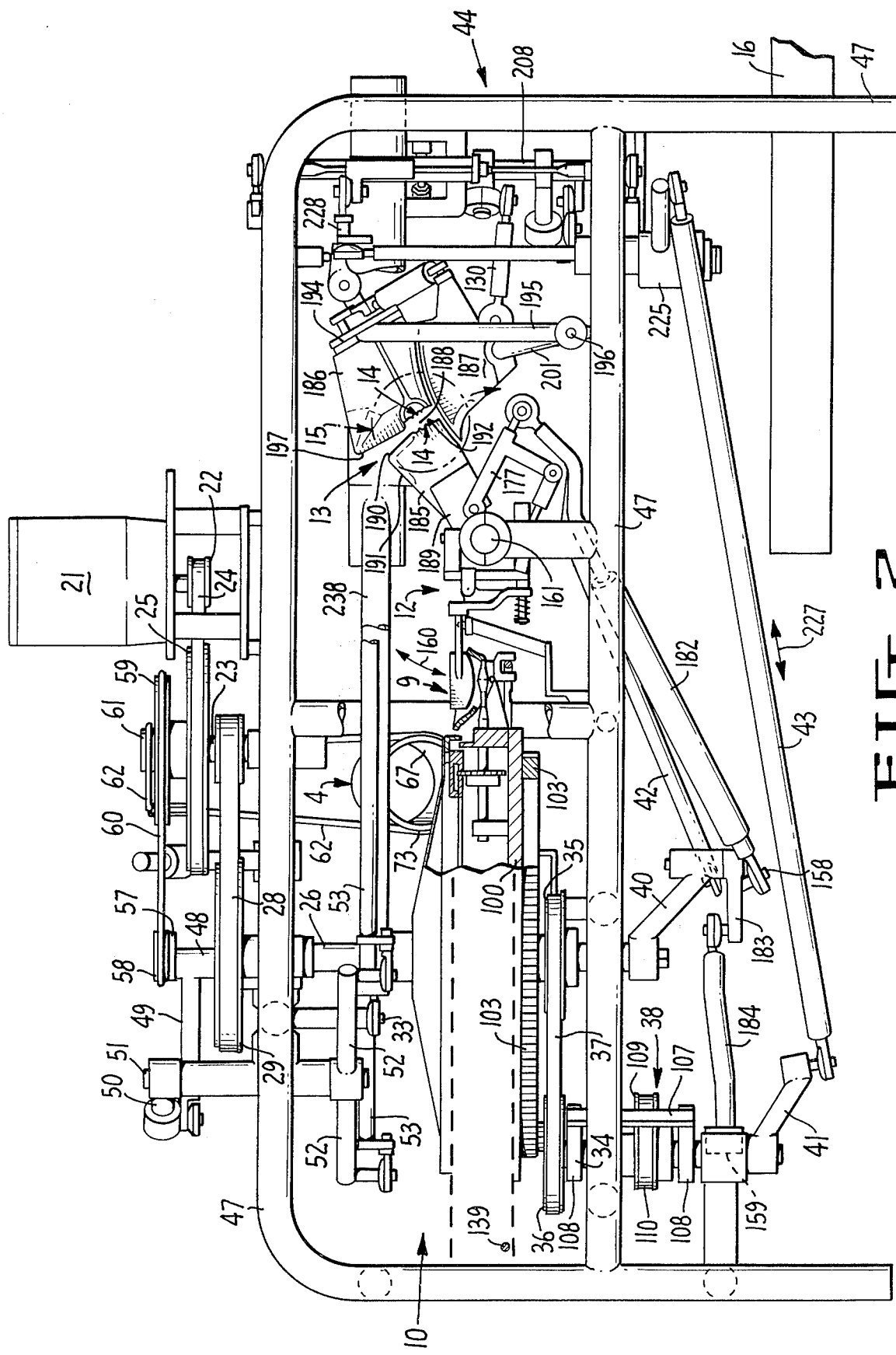
FIG. 2 is a side elevational view of the peach pitter of FIG. 1.
Figure 3:
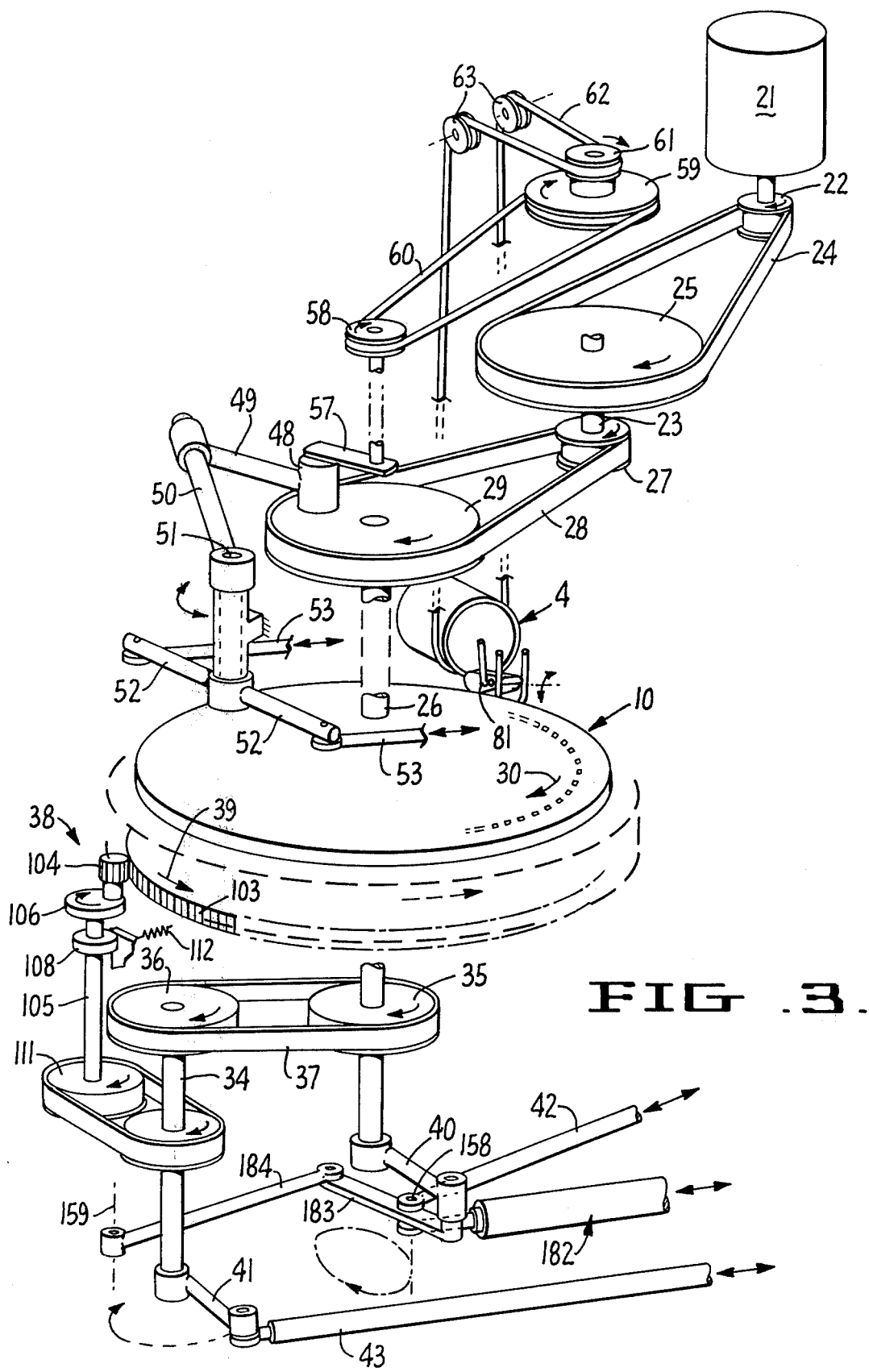
FIG. 3 is an exploded perspective view of the principal drive train of the peach pitter of FIGS. 1, 2.
Figure 6:
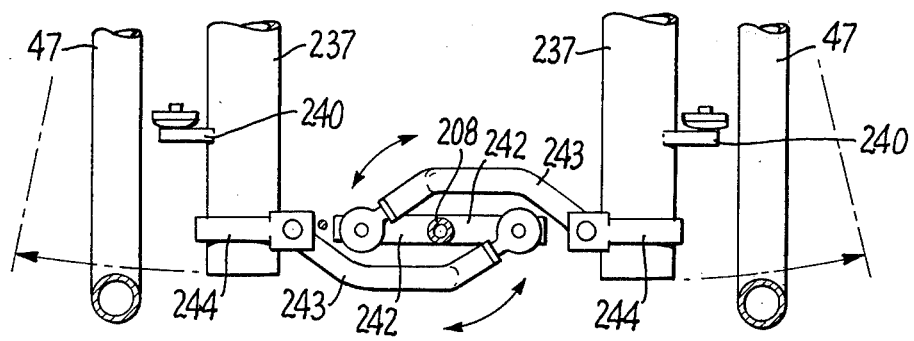
FIG. 6 is a partial sectional view as seen from line 6—6 of FIG. 4.

Extending from a boss 48 mounted on pulley 28 eccentric to shaft 26 is a crank arm 49 which is pivotally connected at its other end to one end of an arm 50 (FIGS. 1–3). The other end of arm 50 is secured to vertical shaft 51, from the other end of which oppositely extend arms 52. The outer ends of arm 52 are pivotally connected to rods 53 which extend toward each of peach gripping jaws 15 and are operatively connected to the means 55 for rotating said jaws.

From this structure it will be noted that as main shaft 26 rotates through 360 degrees, crank 49 and arm 50 drive arms 52 from the position shown in FIG. 1 to a position extending from upper right to lower left and return as indicated by arrow 56. This action results in generally oppositely reciprocating movement of rods 53 thereby rotating peach gripping jaws in opposite directions during approximately a third of a single revolution (to twist the gripped peach halves loose from the held pit) and during the remainder of the revolution to return the open jaws to their initial positions. In the positions shown in FIG. 1 jaws 15 have just been rotated to twist the peach halves and are in a position to be returned to their initial, before-pitting, positions.

Also secured to the upper end of boss 48 is a crank arm 57 (FIGS. 1–3) which projects back toward and supports a pulley 58 over the center of shaft 26. Pulley 58, therefore, rotates about the same center and at the same speed as shaft 26. Pulley 58 drives idler pulley 59, which is rotatively mounted on intermediate shaft 23, by belt 60.

A pulley 61 is rotatively mounted on shaft 23 and is secured to idler pulley 59. A belt 62 trained over pulley 61 and a pair of pulleys 63 mounted on a horizontal stub shaft 64 serves to rotatively drive tubular feeder 4.

In substance by the above (FIGS. 1–3), all the major functional components of the peach pitter, the feeder 4, aligner 10, transfer mechanism 12, peach bisecting blades 13 carrying pit gripping teeth 14, and peach gripping and twisting jaws 15, are connected to and driven from main drive shaft 26, supported in the central plane of the machine and about which aligner 10 is supported for rotation.

PEACH BISECTING BLADES AND PIT GRIPPERS

Blades 13 are comprised of a fixed blade 185 (FIGS. 2, 7) and relatively moveable upper and lower blades 186, 187, respectively. All three blades are supported in the central plane of the machine described herein, which central plane also includes the center of rotation of aligner 10 and transfer station 11. Blades 185–187 are shown in FIGS. 2, 7 in their closed position surrounding a central pitting axis 188 which extends transversely through the pit of the peach transferred to the pitting station between blades 185 and 186 by mechanism 12 along a path of travel and in the one direction denoted by the right hand arrow 160 (FIG. 2).

Blade 185 is secured to shaft 161 by a bracket 189 (FIGS. 1, 2) and extends upwardly away from such shaft on the side opposite aligner 10 at an angle of approximately 30° from the horizontal. The outer edge 190 of blade 185 is formed generally to an arc about the center of transfer shaft 161.

The outer portion of the edge of blade 185 facing toward transfer mechanism 12 and the adjacent portion of outer edge 190 are sharpened to provided a cutting edge 191 which is thereby presented to a peach as the same is transferred to the location of axis 188. Cutting edge 191, therefore, slices through the flesh of a peach nearly to its pit as the same is transferred from aligner 10 to the pitting position with its pit intersecting axis 188.

The adjoining portion of edge 190 carries pit gripping means 14 (FIGS. 2, 7) in the form of outwardly projecting teeth 192 facing axis 188 and the edge of the pit of a peach in the pitting position.

Blade 186 is supported for relative movement toward and away from blade 185, in the direction of arrow 193, (FIGS. 2, 7–9) by a bracket 194 mounted at the end of rigid links 195 pivoted at their other ends 196 to frame 47. At its edge remote from bracket 194 facing blade 185 and around a portion of its upper edge, blade 186 is sharpened to provide cutting edge 197 for the same purpose of slicing through the flesh of the peach presented to the blades by transfer mechanism 12. That portion of the edge of blade 186 facing teeth 192 is provided with the other half of pit gripping means 14 in the form of projecting teeth 198 for the purpose of gripping the peach pit between said opposed teeth as blade 186 is moved toward blade 185.

By this means a pair of relatively moveable peach bisecting blades 185, 186 having cutting means 191, 197 and pit gripping means 192, 198 on their opposed, spaced edges are provided at the pitting station adjacent axis 188. An elongated space is defined between and by the blade edges, is thereby arranged generally in continuation of the path of travel of the peach delivered by transfer mechanism 12, is open at both ends, and extends generally downwardly.

The third, lower blade 187 is mounted for swinging movement toward and away from shaft 161, in the direction of arrow 199 (FIG. 7), across the end of the space between blades 185, 186 on a bracket 200 (FIGS. 2, 7, 10) secured to the upper ends of fixed links 201 which are similarly pivotally connected at their lower ends to frame 47.

The upper edge 204 of blade 187 and the adjacent lower edges of blades 185 and 186 are arcuately formed generally about the axis of pivots 196 (FIGS. 2, 7). The edge of blade 187 facing toward shaft 161 is arcuately formed, as at 205, to provide a point 202 and edges 204, 205 are sharpened to provide cutting edges 203 adjacent point 202. As blade 187 swings from a position remote from shaft 161 to the position shown in FIGS. 2, 19 cutting edges 203 and point 202 slice across the lower end of the peach through the remainder of the flesh and nearly to the end of the pit supported in the pitting position intersecting axis 188.

Figure 4:
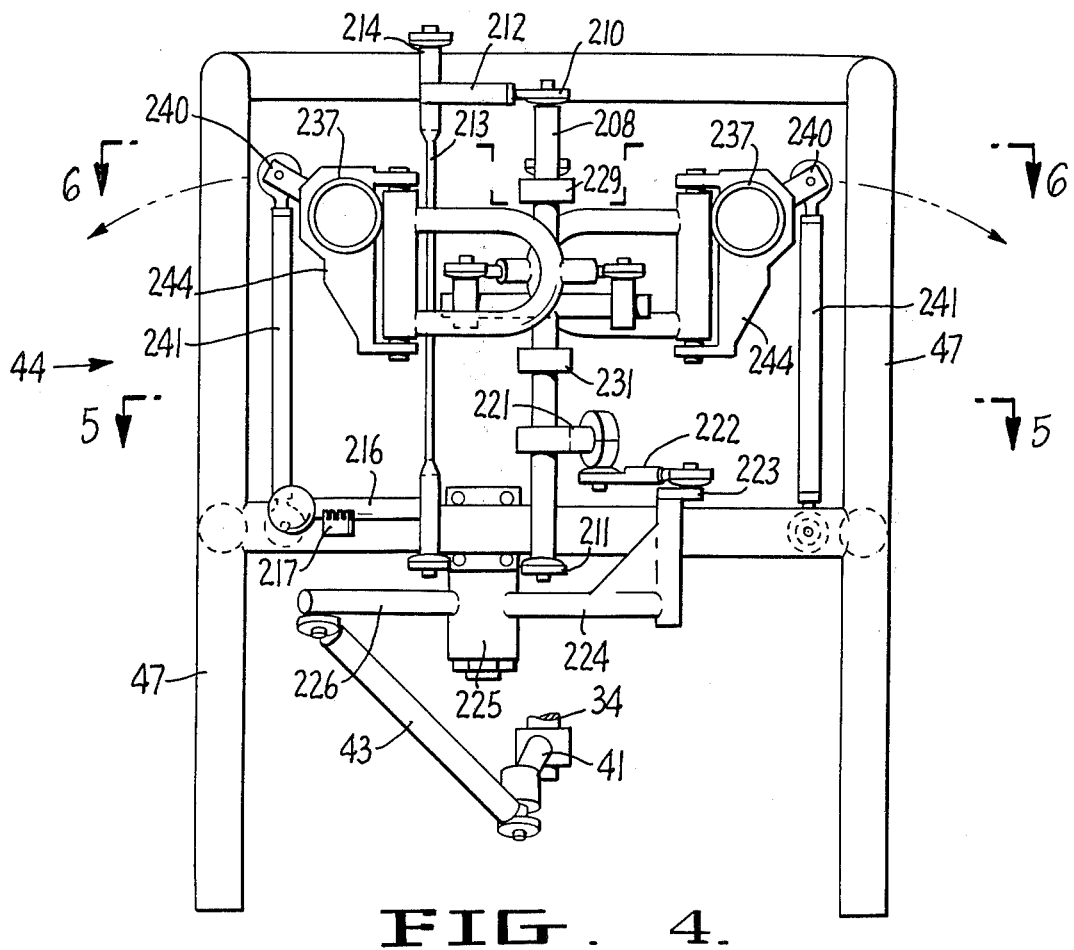
FIG. 4 is an elevational view of the right hand end of the peach pitter of FIGS. 1, 2.

Blades 186, 187 are swung in the directions of arrows 193, 199 to and from their positions shown in FIGS. 2, 19 during pitting to positions remote from axis 188 by virtue of generally vertically extending, oscillating shaft 208 (FIGS. 7–10). Shaft 208 (FIGS. 4, 8) is supported for oscillation about its axis in the direction of arrow 209 in upper and lower spherical bearings 210, 211, respectively. Bearing 211 is secured to a cross piece of frame 47 whereas bearing 210 is secured to one end of an arm 212 projecting from a generally vertically extending torsion rod 213. The upper and lower ends of torsion rod 213 are respectively supported in spherical bearings 214, 215 secured to cross pieces of frame 47. An arm 216 (FIGS. 8, 10) projecting laterally from the lower end of torsion rod 213 has its outer end held in the notches of adjusting rack 217 and provides the function of holding rod 213 in torsion so that its upper end yieldably urges bearing 210 supporting the upper end of shaft 208 toward upper blade 186 and against a cushion 218 (FIGS. 1, 9) supported on a cross piece of frame 47. In this manner torsion rod 213 serves to bias the upper end of shaft 208 toward blade 186 and the degree of such bias may be adjusted during operation of the machine by swinging adjusting arm 216, which is accessible from the exterior of the machine, to different notches on rack 217 and, thereby, adjusting the amount of torsion in rod 213.

Figure 5:
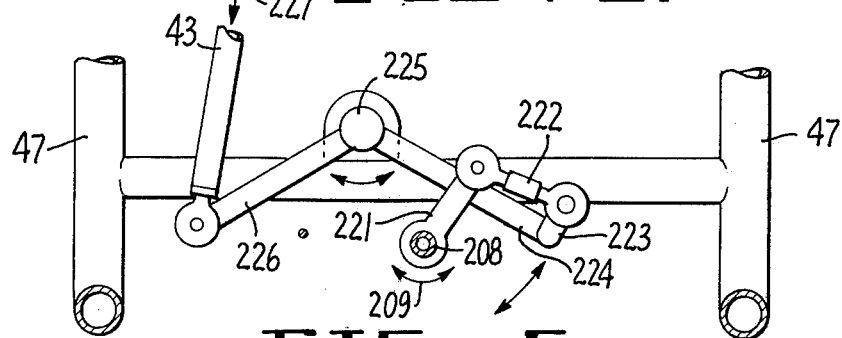
FIG. 5 is a partial sectional view as seen from line 5—5 of FIG. 4.

Shaft 208 is caused to oscillate by linkage assembly 44 comprising an arm 221 (FIGS. 4, 5) secured thereto and projecting to a pivotal connection at its other end with one end of a link 222. The other end of link 222 is, in turn, pivoted to an extension 223 at the outer end of a driving arm 224. Arm 224 is secured to and projects from hub 225, which is rotatively mounted on a portion of frame 47. Hub 225 is caused to oscillate through approximately 180 degrees by virtue of the pivotal connection between the outer end of an arm 226 projecting from hub 225 with the outer end of driving link 43. By virtue of crank 41 supported on continuously rotating shaft 34 link 43 travels back and forth in the direction of arrow 227 (FIGS. 2, 5) thereby oscillating arm 226, hub 225, and arm 224.

The purpose of link 222 connecting arm 221 and the extension 223 at the end of arm 224 is to modify the simple harmonic motion of link 43 to an oscillation of shaft 208 through approximately 180 degrees with a longer dwell period at both ends of the cycle of operation (180 degrees of rotation of shaft 34 and crank 41).

Upper blade 186 is moved from its position shown in FIGS. 2, 19 to a retracted position remote from axis 188 by link 228 (FIGS. 2, 7, 9) pivotally connected between bracket 194 for the upper blade and an arm 229 secured to shaft 208. Similarly, lower blade 187 is moved to and from the position shown in FIGS. 2, 19 in the direction of arrow 199 by virtue of a link 230 (FIGS. 2, 7, 10) connected between the bracket 200 for said blade and an arm 231 secured to and projecting from shaft 208.

Link 228 and arm 229 for upper blade 186 and link 230 and arm 231 for lower blade 187 function as toggle linkages, travelling slightly over center at the ends of the cycle of oscillation of shaft 208. Such linkage multiplies the force applied to blades 186 and 187 and provides additional dwell time.

The throw of crank 229 and the length of link 228 is sufficient to move upper blade 186 to a position with its pit gripping teeth 198 closer to the teeth 192 of blade 185 than shown in FIGS. 2, 7 in the absence of a peach in the pitting position with its pit intersected by axis 188. When in that position, arm 212 is in engagement with cushion 218 and shaft 208 is in essentially the vertical position.

Under normal pitting operations, however, when a peach has been transferred to the pitting position, blade 186 travels through the flesh of the peach until teeth 198 engage the edge of the pit and push it into engagement with teeth 192 on fixed blade 185. At this point further movement of blade 186 through the remaining portion of the throw of crank arm 229 would cause the peach pit to be fractured by teeth 192, 198. Instead, the remaining rotation of crank arm 229 serves to tilt the upper end of shaft 208 away from upper blade 186 (FIGS. 7, 9) against the torsion in rod 213 transferred to the upper bearing 210 of said shaft through arm 212. As a result, torsion rod 213 acts to yieldably urge teeth 198 of blade 186 into engagement with the pit and, correspondingly, urge the pit into engagement with teeth 192.

The pit is thus firmly gripped by the pit gripping means 14, as by being held between the opposed pit gripping teeth 192, 198 which are yieldably urged together into engagement with the edges of such pit. The degree of force exerted by teeth 192, 198 in gripping the pit may be adjusted during operation of the pitter by changing the degree of torsion in rod 213 by moving adjusting arm 216 so that the appropriate amount of compression is applied to pits of different sizes.

By virtue of the extended dwell time at the ends of the cycle of oscillation of shaft 208 and the toggle linkages driving blades 186, 187, the peach bisecting blades are maintained with teeth 192, 198 in gripping relation holding the pit against rotation during the twisting of the peach halves from the pit by peach gripping jaws 15 and holding moveable blades 186 and 187 in their retracted positions for sufficient time for transfer mechanism 12 to transfer a new peach to the pitting position on fixed blade 185.

It will be noted that as a successive peach is being transferred to the pitting position in the direction of arrow 160 (FIG. 2) that the pitted peach halves and their pit are falling by gravity into exit flume 16 in the direction of arrow 232 which is generally in continuation of the arcuate path of travel of the incoming peach. By this method, the successive peach being fed to blade 185 serves to assure that the pitted peach halves and the pit will be discharged from the pitting position in the direction of arrow 232, the same direction in which it was transferred to such position should they tend to hang up on the peach bisecting blades or pit gripping teeth. This "flow-through" method eliminates need for pit ejectors and the like, and facilitates a more rapid pitting operation. By the method of discharging the pitted peaches and pits from the pitting station in continuation of the path of travel of transfer to said station and in the same generally downwardly extending direction, the incoming peach assists gravity in clearing the pitting station and discharging the pitted peaches and pits.

At the time of discharge of the pitted peach and its pit, lower blade 187 is in the retracted position so as to permit free discharge of the separated peach halves and pit. Upon arrival of a successive peach to the pitting position lower blade 187 moves toward shaft 161 to slice across its bottom portion as previously described. Such movement of lower blade 187 also tends to clear any pit fragments or any other debris which might accumulate along the lower edges of blades 186, 187.

It will be noted that by driving all the operative elements from main shaft 26 timing of the various operations of the pitting machine described herein is greatly simplified. During each revolution of shaft 26, for example, an aligner cup 9 is positioned at fill station 8 at the discharge end of feeder 4 for receiving a peach therefrom and another cup 9, having traversed the path of aligner 10 is positioned at transfer station 11. Because of the slower, intermittent travel of aligner cups 9 around the path of aligner 10, ample opportunity is provided for the peaches to be aligned with their suture planes in the central plane of the machine by the time they arrive at transver station 11.

As aligner cups 9 are being translated to the above noted stations the peach impaled on blades 13 is in the process of being pitted by jaws 15. Upon completion of that pitting cycle jaws 15 and blades 13 open to release the pitted peach halves and pit and transfer mechanism 12 is actuated to transfer a peach from cup 9 at station 11 to the pitting position intersecting axis 188. It is during the operation that jaws 15 are returned to their original positions and the next aligner cup 9 is translated to transfer station 11.

Although one embodiment of the machine has been described herein it should not be taken as restrictive of the invention which may take various modified forms.

What is claimed is:

1. In a cling peach pitter of the type in which the pit of a cling peach is held stationary while the peach halves are relatively twisted loose therefrom about an axis extending through such pit, including a pair of peach bisecting blades having cutting means and pit gripping means extending along their spaced, opposed edges and moveable relatively toward each other through the flesh of a peach and into gripping relation with its pit during twisting as each peach of a succession thereof is transferred along a path of travel in one direction to a pitting station between said edges, the improvement comprising:
    (a) means supporting said blades in the same plane at said pitting station with said opposed edges defining the two opposed sides of an elongated space therebetween;
    (b) means for moving said opposed edges of said blades transversely of said path of travel relatively toward each other to move said pit gripping means into gripping relation with said pit and away from each other;
    (c) said space extending generally in continuation of said path of travel;
    (d) said space opening outwardly of both opposed ends thereof,
wherein a peach is transferred in said one direction into said space through one open end of said space at substantially the same time that the pitted peach and pit are discharged from the other open end thereof in the same direction.

2. The improvement of claim 1, in which:
    (e) said space extends generally downwardly toward said other end, whereby said pitted peach and said pit are discharged along said path under the influence of gravity.

3. The improvement of claim 1, including:
    (e) a separate third blade having cutting means thereon moveable across said other end of said space through a portion of the peach at said pitting station.

4. In a peach pitter including a pair of coplanar peach bisecting blades having elongated cutting means and pit gripping means extending along their spaced, opposed edges and moveable relative to each other through the flesh of the peach and into gripping relation with opposed edges of its pit, the improvement comprising:
    (a) means for moving said blades transversley of said opposed edges relatively toward and away from each other into and out of said gripping relation;
    (b) adjustable biasing means biasing said blades toward each other and into said gripping relation; and,
    (c) means for adjusting said biasing means accessible from the exterior of said peach pitter for adjusting the same during operation thereof.

* * * * *